(12) United States Patent
Koizumi

(10) Patent No.: US 9,454,660 B2
(45) Date of Patent: Sep. 27, 2016

(54) SECURITY VERIFICATION DEVICE AND A SECURITY VERIFICATION METHOD

(71) Applicant: NEC Corporation, Tokyo (JP)

(72) Inventor: Jun Koizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 8 days.

(21) Appl. No.: 13/981,892

(22) PCT Filed: Nov. 30, 2012

(86) PCT No.: PCT/JP2012/081719
§ 371 (c)(1),
(2) Date: Jul. 25, 2013

(87) PCT Pub. No.: WO2013/081185
PCT Pub. Date: Jun. 6, 2013

(65) Prior Publication Data
US 2015/0074801 A1 Mar. 12, 2015

(30) Foreign Application Priority Data
Dec. 1, 2011 (JP) ................................. 2011-263754

(51) Int. Cl.
*H04L 9/32* (2006.01)
*G06F 11/00* (2006.01)
*G06F 21/57* (2013.01)

(52) U.S. Cl.
CPC ......... *G06F 21/57* (2013.01); *G06F 2221/034* (2013.01)

(58) Field of Classification Search
CPC ............... H04L 63/08; H04L 63/0869; H04L 63/0876; H04L 63/20; H04L 63/302; H04L 63/1416; H04L 63/1425; H04L 63/1433; H04L 63/0236; H04L 63/0263; H04L 63/029; G06F 21/57; G06F 2221/034

USPC ......... 726/1–4, 11, 22–30, 34; 713/168–170, 713/176, 189, 193
See application file for complete search history.

(56) References Cited

U.S. PATENT DOCUMENTS 7,069,580 B1 * 6/2006 Deitz et al. ................. 726/2
7,111,321 B1 * 9/2006 Watts et al. ................ 726/2
(Continued)

FOREIGN PATENT DOCUMENTS

CN          1816822 A    8/2006
CN       101385034 A    3/2009
(Continued)

OTHER PUBLICATIONS

Intrnational Search Report for International Patent Application No. PCT/JP2012/081719 mailed Mar. 5, 2013. 3 pages.
(Continued)

*Primary Examiner* — Hosuk Song
(74) *Attorney, Agent, or Firm* — Wilmer Cutler Pickering Hale and Dorr LLP

(57) ABSTRACT

The present invention provides a security verification device and a security verification method which are capable of verifying that elements for implementing security measures necessary for a system can be prepared without omission. The security verification device and the security verification method select a verification item on the basis of security requirement information, generate security requirement information of parts specified by the verification item on the basis of a security target model, generate information which indicates a possessed function of security of the parts included in the security target model on the basis of a function item which is extracted on the basis of an implementation method included in the verification item and output a comparison and verification result of the security requirement information of the parts and the information which indicates the possessed function.

11 Claims, 15 Drawing Sheets

(56) References Cited

U.S. PATENT DOCUMENTS

| | | | |
|---|---|---|---|
| 7,610,488 B2 * | 10/2009 | Sueyoshi et al. | 713/169 |
| 7,797,544 B2 * | 9/2010 | Dillaway et al. | 713/179 |
| 8,191,109 B2 | 5/2012 | Rhodes | |

FOREIGN PATENT DOCUMENTS

| | | | |
|---|---|---|---|
| JP | 2005258512 A | 9/2005 | |
| JP | 2006350708 A | 12/2006 | |
| JP | 2009110177 A | 5/2009 | |
| JP | 2011197799 A | 10/2011 | |
| JP | 2011232874 A | 11/2011 | |

OTHER PUBLICATIONS

Extended European Search Report issued by the European Patent Office for European Application No. 12853440.1 mailed on Jul. 28, 2014 (7 pages).

Obe, R. O. et al., "PostGIS in Action," Manning Publication Co., Stamford, CT (USA), 522 pages (May 1, 2011).

Chinese Office Action issued by the People's Republic of China Patent Office for Application No. 2012800067937 dated Apr. 1, 2015 (7 pages).

* cited by examiner

Fig.4

210 VERIFICATION ITEM DATABASE

| 212 SECURITY FUNCTION NAME | 213 IMPLEMENTATION METHOD | 214 PARTS INFORMATION |
|---|---|---|
| COMMUNICATION ROUTE SEPARATION | INFORMATION FLOW CONTROL | FIREWALL |
| SPOOFING PREVENTION | SERVER AUTHENTICATION METHOD | ALL SERVERS |
| COUNTER MALWARE MEASURES MANAGEMENT | MEASURES SOFTWARE INSTALL | ALL SERVERS |
| SUBJECT AUTHENTICATION | ID/PASSWORD METHOD | WWW SERVER, AP SERVER, DB SERVER |
| ADMINISTRATOR AUTHORITY PROTECTION | ADMINISTRATIVE AUTHORITY CONTROL | ADMINISTRATION SERVER |
| PRESERVED INFORMATION INTEGRITY SECURING | DIGITAL SIGNATURE | DB SERVER |

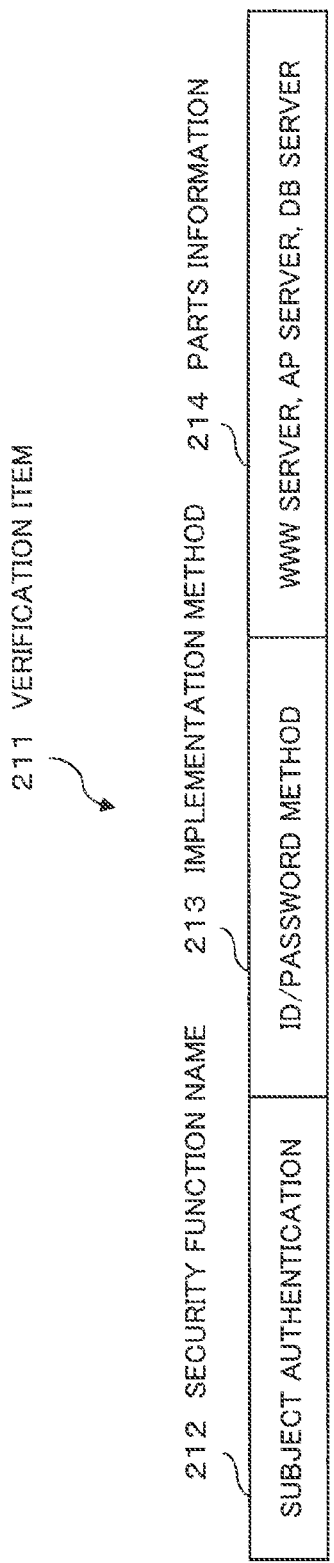

Fig.6

230 REQUIREMENT MODEL

| 232 PARTS IDENTIFICATION INFORMATION | 233 SECURITY FUNCTION NAME | 234 IMPLEMENTATION METHOD |
|---|---|---|
| EXTERNAL WWW SERVER | SUBJECT AUTHENTICATION | ID/PASSWORD METHOD |
| AP SERVER | SUBJECT AUTHENTICATION | ID/PASSWORD METHOD |
| DB SERVER | SUBJECT AUTHENTICATION | ID/PASSWORD METHOD |

Fig.7

310 FUNCTION ITEM DATABASE

| 312 PARTS IDENTIFICATION INFORMATION | 313 SECURITY FUNCTION NAME | 314 IMPLEMENTATION MEANS |
|---|---|---|
| EXTERNAL WWW SERVER | IDENTITY AUTHENTICATION | ID/PASSWORD METHOD |
| EXTERNAL WWW SERVER | ENCRYPTION | SSL/TLS COMMUNICATION |
| AP SERVER | IDENTITY AUTHENTICATION | ID/PASSWORD METHOD |
| DB SERVER | IDENTITY AUTHENTICATION | ID/PASSWORD METHOD |
| AP SERVER | IDENTITY AUTHENTICATION | ACCOUNT LOCK |
| DB SERVER | IDENTITY AUTHENTICATION | ACCOUNT LOCK |
| INTERNAL WWW SERVER | IDENTITY AUTHENTICATION | ID/PASSWORD METHOD |

Fig.8

320 FUNCTION ITEM

| 312 PARTS IDENTIFICATION INFORMATION | 313 SECURITY FUNCTION NAME | 314 IMPLEMENTATION MEANS |
|---|---|---|
| EXTERNAL WWW SERVER | IDENTITY AUTHENTICATION | ID/PASSWORD METHOD |
| AP SERVER | IDENTITY AUTHENTICATION | ID/PASSWORD METHOD |
| DB SERVER | IDENTITY AUTHENTICATION | ID/PASSWORD METHOD |
| INTERNAL WWW SERVER | IDENTITY AUTHENTICATION | ID/PASSWORD METHOD |

Fig.13

120 SYSTEM MODEL

| 142 CONNECTION SOURCE IDENTIFICATION INFORMATION | 143 CONNECTION DESTINATION IDENTIFICATION INFORMATION |
|---|---|
| INTERNET | ROUTER |
| ROUTER | FIREWALL 1 |
| FIREWALL 1 | NTP |
| FIREWALL 1 | DNS |
| FIREWALL 1 | EXTERNAL WWW SERVER |
| FIREWALL 1 | FIREWALL 2 |
| FIREWALL 2 | AP SERVER |
| FIREWALL 2 | DB SERVER |
| FIREWALL 2 | INTERNAL WWW SERVER |

Fig.15

410 SECURITY RULE DATABASE

| 412 SECURITY FUNCTION NAME | 413 RULE IDENTIFICATION INFORMATION |
|---|---|
| COMMUNICATION ROUTE SEPARATION | 2.3.4.1(1)(a) |
| SPOOFING PREVENTION | 2.3.3.2(1)(a)(I) |
| COUNTER MALWARE MEASURES MANAGEMENT | 2.2.2.2(1)(d) |
| SUBJECT AUTHENTICATION | 2.2.1.1(1)(a) |
| ADMINISTRATOR AUTHORITY PROTECTION | 2.2.1.1(1)(i) |
| PRESERVED INFORMATION INTEGRITY SECURING | 2.2.1.6(1)(d) |

SECURITY VERIFICATION DEVICE AND A SECURITY VERIFICATION METHOD

This application is a national stage application of prior International Application No. PCT/JP2012/081719, entitled "Security Verification Device and Security Verification Method", filed on Nov. 30, 2012, which claims the benefit of and priority to JP Application No. 2011-263754 filed Dec. 1, 2011, the disclosure of each of which is hereby incorporated by reference in its entirety for all purposes.

TECHNICAL FIELD

The present invention relates to security of a system and relates in particular to a security verification device and a security verification method which verify a security design and a program for that.

BACKGROUND ART

Various related technologies are known concerning a security technology.

Patent document 1 discloses an information security measures decision support device, indicated below.

The information security measures decision support device receives an input of attribute information of a diagnosis target system. Consecutively, the information security measures decision support device refers to such as a list of threats or relation between the threats and security measures (hereinafter, described simply as 'measures') and finds out problems on information security included in the diagnosis target system. Here, the list of threats is one generated on the basis of a security event transition model which is a structured procedure of an operation of illegal accesses.

Next, the information security measures decision support device presents patterns for measures to keep the information security of the diagnosis target system.

Also, the information security measures decision support device refers to a list of measures which indicates cost and effects of each measure and calculates, for each measure found out, the cost that the measure needs, the effects in case the measure is performed, residual risk and so on. And the information security measures decision support device selects and presents a measure for matching a request on the basis of this calculation result. The measure for matching the request is such as: an example of the measure which minimizes the cost and can secure required strength of the measure, an example of the measure which makes performance per cost maximum, and an example of the measure which disregards the cost and maximizes strength of the security measure.

Patent document 2 discloses an integrated system security design method, indicated below.

The integrated system security design method of patent document 2 is a security design method related to a site and an information system which conform to two standards of International security standard ISO17799 (ISMS (Information Security Management System)) and ISO15408 (CC (Common Criteria)).

A security design support device which implements the integrated system security design method receives, concerning a certain site, an input of information of a property group which becomes a target of security.

Next, the security design support device displays the inputted information of the property group. Then the security design support device receives an input of 'information of property' of the information system corresponding to each property group.

Next, the security design support device displays the inputted information of the property group. Then the security design support device receives an input of 'information of threats of site' concerning each property group.

Next, the security design support device displays, on the basis of a corresponding relationship between the property group and the property, the inputted 'information of threats of site' and the 'information of property' concerning the property group. Then the security design support device receives an input of 'information of threats of information system' concerning the property.

Next, the security design support device displays the inputted 'information of threats of site'. Then the security design support device receives an input of 'measures policy of site' concerning each of the threats of site.

Next, the security design support device displays, on the basis of a corresponding relationship between the 'information of threats of site' and the 'information of threats of information system', the 'measures policy of site' which was inputted corresponding to the 'information of threats of site' and the 'information of threats of information system'. Then the security design support device receives an input of 'measures policy of information system' concerning each of the threats of information system.

Next, the security design support device displays the inputted 'measures policy of site' and displays an upper-level measures standard by referring to a measures standard mapping table. Then, the security design support device receives a selection input of the upper-level measures standard concerning the selected 'measures policy of site'. Here, the measures standard mapping table is a table which stores a corresponding relationship between the upper-level measures standard conforming to the ISMS and a lower-level measures standard conforming to the CC.

Next, the security design support device displays, on the basis of a corresponding relationship between the 'measures policy of site' and the 'measures policy of information system', the 'measures policy of information system' corresponding to the selected 'measures policy of site'. Next, the security design support device displays the upper-level measures standard which are selected corresponded to the 'selected measures policy of site' and the lower-level measures standard which has the corresponding relationship in the measures standard mapping table. Then, the security design support device receives a selection input of the lower-level measures standard concerning the selected 'measures policy of information system'.

Next, the security design support device generates and outputs security specifications conforming to the ISMS and security specifications conforming to the CC according to the corresponding relationships including those correspondences from the correspondence of the information of the property group and the information of the property until the correspondence of the selected upper-level measures standard and the selected lower-level measures standard.

Patent Document

[Patent document 1] Japanese Unexamined Patent Application Publication No. 2009-110177
[Patent document 2] Japanese Unexamined Patent Application Publication No. 2005-258512

SUMMARY OF THE INVENTION

Problem to be Solved by the Invention

However, in the technologies which are disclosed in the patent documents mentioned above, there is a problem that it is not possible to verify that elements (for example, equipment and software) for implementing security measures necessary for a system can be prepared without omission.

The reason that the verification is not possible is as follows.

In a security design of a system, it is necessary to implement IT (Information Technology) security measures, which satisfy security requirements (for example, confidentiality/integrity protection of property which a customer invests) of the system, by the equipment and the software of which the system is structured.

The security requirements of the system are, for example, structure/operation requirements of the system meeting a request from a user. The security requirements of the system are also those which correspond to various security rules designated by the user (security requirements defined by the industry such as NISC (National Information Security Center) standard).

The IT security measures need to be verified, concerning how to implement those security requirements of the system by the elements of which the system is structured, whether it is designed with certainty.

The information security measures decision support device of patent document 1 does not verify integrity between an implementation means of the security measures by the system and each component. Therefore, in the design by the information security measures decision support device, it cannot be guaranteed whether a product necessary for the security design is included without omission, and there is a possibility that missing product supply and so on may occur at the time of system construction.

Similarly, the integrated system security design method of patent document 2 does not verify integrity between an implementation means of the security measures by the system and each component either.

The object of the present invention is to provide a security verification device and a security verification method which can solve the problems mentioned above and a program for that.

Means for Solving a Problem

A security verification device according to the present invention includes: a verification item storage means which stores equal to or more than one of verification items which includes at least a security function name which is information for specifying contents of security, an implementation method which is information for indicating an implementation method of said security, and parts information which includes parts identification information which is identification information of each of equal to or more than one of parts which implements said security; a function item storage means which stores equal to or more than one of function items which includes at least said parts identification information, said security function name, and an implementation means which is information for indicating an implementation means of security specified by said security function name of parts specified by said parts identification information; a requirement model generation means which, on the basis of a system requirement which is information for indicating requirements of security of a system to be verified, selects and outputs said verification item from said verification item storage means, and, on the basis of a security target model which is information for indicating a structure of a security target part of said system to be verified, generates and outputs information which indicates the requirements of security of each part which is specified by the parts identification information included in the parts information of said selected verification item; a possessed function model generation means which, on the basis of the implementation method which is included in said verification item which said requirement model generation means selected, extracts said function item from said function item storage means, and on the basis of said extracted function item, generates and outputs information which indicates a possessed function of security of each part included in said security target model; and a verification means which performs comparison and verification of said information which indicates the requirements of security of each part and said information which indicates the possessed function of security of each part, and outputs a verification result of said comparison and verification.

A security verification method according to the present invention including: a computer which stores equal to or more than one of verification items which includes at least a security function name which is information for specifying contents of security, an implementation method which is information for indicating an implementation method of said security and parts information which includes parts identification information which is identification information of each of equal to or more than one of parts which implements said security, and equal to or more than one of function items which includes at least said parts identification information, said security function name and an implementation means which is information for indicating an implementation means of security specified by said security function name of parts specified by said parts identification information, on the basis of a system requirement which is information for indicating requirements of security of a system to be verified, selecting and outputting said verification item from among said stored equal to or more than one of the verification items; on the basis of a security target model which is information for indicating a structure of a security target part of said system to be verified, generating and outputting information which indicates the requirements of security of each part which is specified by the parts identification information included in the parts information of said selected verification item; on the basis of the implementation method which is included in said selected said verification item, extracting said function item from among said stored equal to or more than one of the function items; on the basis of said extracted function item, generating and outputting information which indicates a possessed function of security of each part included in said security target model; performing comparison and verification of said information which indicates the requirements of security of each target part and said information which indicates the possessed function of security of each part; and outputting a verification result of said comparison and verification.

A non-volatile storage medium according to the present invention to store a program which makes a computer storing equal to or more than one of verification items which includes at least a security function name which is information for specifying contents of security, an implementation method which is information for indicating an implementation method of said security and parts information which includes parts identification information which is identification information of each of equal to or more than one of parts which implements said security, and equal to or more than one of function items which includes at least said parts identification information, said security function name and an implementation means which is information for indicating an implementation means of security specified by said security function name of parts specified by said parts identification information carry out: a process which, on the basis of a system requirement which is information for indicating requirements of security of a system to be verified, selects and outputs said verification item from among said stored equal to or more than one of the verification items; a process which, on the basis of a security target model which is information for indicating a structure of a security target part of said system to be verified, generates and outputs information which indicates the requirements of security of each part which is specified by the parts identification information included in the parts information of said selected verification item; a process which, on the basis of the implementation method which is included in said selected said verification item, extracts said function item from among said stored equal to or more than one of the function items; a process which, on the basis of said extracted function item, generates and outputs information which indicates a possessed function of security of each part included in said security target model; a process which performs comparison and verification of said information which indicates the requirements of security of each target part and said information which indicates the possessed function of the security of each part; and a process which outputs a verification result of said comparison and verification.

Effect of the Invention

The present invention has an effect that it becomes possible to verify that the elements for implementing the security measures necessary for the system can be prepared without omission.

BRIEF DESCRIPTION OF THE DRAWINGS

FIG. 4 is a figure showing an example of a verification item database in the first exemplary embodiment.

FIG. 5 is a figure showing an example of a verification item in the first exemplary embodiment.

FIG. 6 is a figure showing an example of a requirement model in the first exemplary embodiment.

FIG. 7 is a figure showing an example of a function item database in the first exemplary embodiment.

FIG. 8 is a figure showing an example of a function item in the first exemplary embodiment.

FIG. 13 is a figure showing an example of a system model in the second exemplary embodiment.

FIG. 15 is a figure showing an example of a security rule database in the third exemplary embodiment.

EXEMPLARY EMBODIMENTS FOR CARRYING OUT OF THE INVENTION

Figure 1:
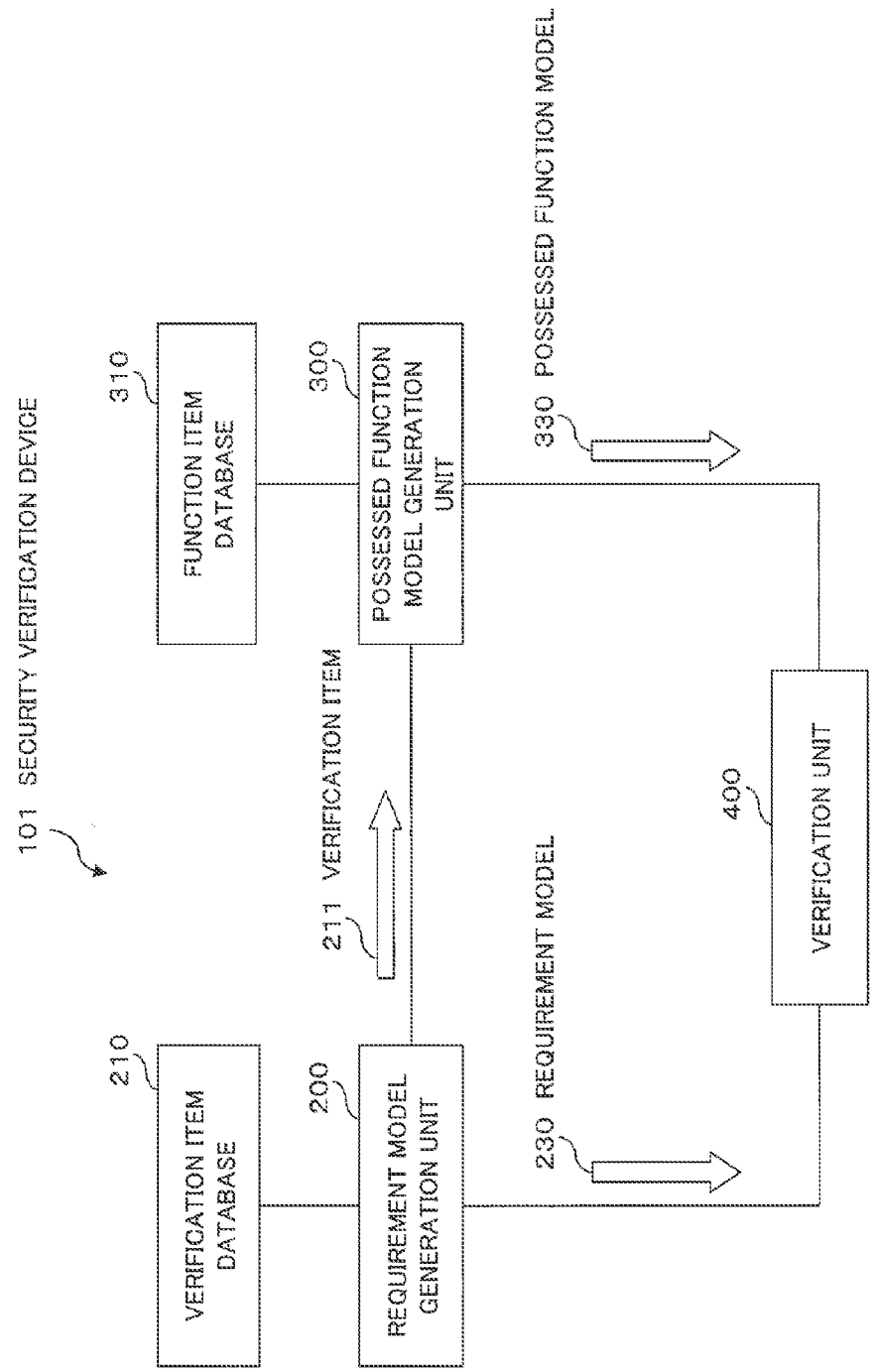
FIG. 1 is a block diagram showing a structure of the first exemplary embodiment.

Embodiment for carrying out the present invention will be described in detail with reference to drawings The First Exemplary Embodiment FIG. 1 is a block diagram showing a structure of the first exemplary embodiment of the present invention.

Referring to FIG. 1, a security verification device 101 according to this exemplary embodiment includes: a requirement model generation unit 200, a verification item database (also called as a verification item storage means) 210, a possessed function model generation unit 300, a function item database (also called as a function item storage means) 310 and a verification unit 400.

First, an outline of operation of the security verification device 101 according to this exemplary embodiment will be described.

The security verification device 101 receives information which indicates requirements of security of a system to be verified from an external device (not shown) or an operator (not shown). Also, the security verification device 101 receives information which indicates a structure of a security target part which corresponds to the requirements of security and which is in the system to be verified. Then the security verification device 101 verifies the security (safety) of the system to be verified on the basis of the received information and outputs a result.

Figure 2:
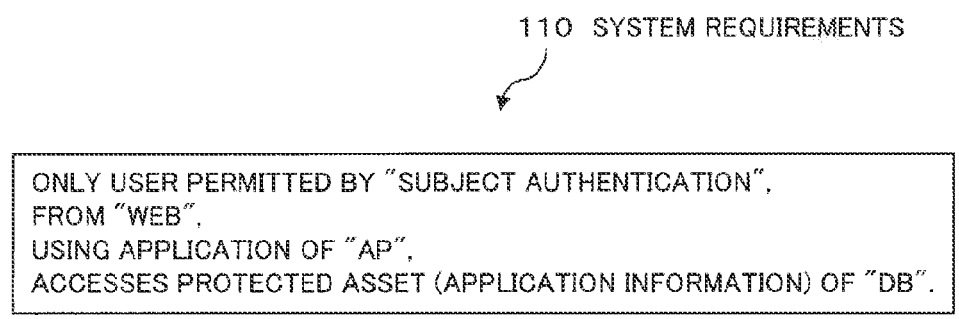
FIG. 2 is a figure showing an example of a system requirement in the first exemplary embodiment.

FIG. 2 is a figure showing an example of a system requirement 110 which is information for indicating the requirements of security of the system to be verified. As shown in FIG. 2, the system requirement 110 includes as keywords which concern the security requirements, for example, 'subject authentication', 'WEB (meaning World Wide Web)', 'AP (APPRECIATION APPLICATION)' and 'DB (DATABASE)'. Further, the system requirement 110 shown in FIG. 2 indicates one case of the requirements of security. However, the system requirement 110 may be one which indicates an arbitrary number of security requirements.

Figure 3:
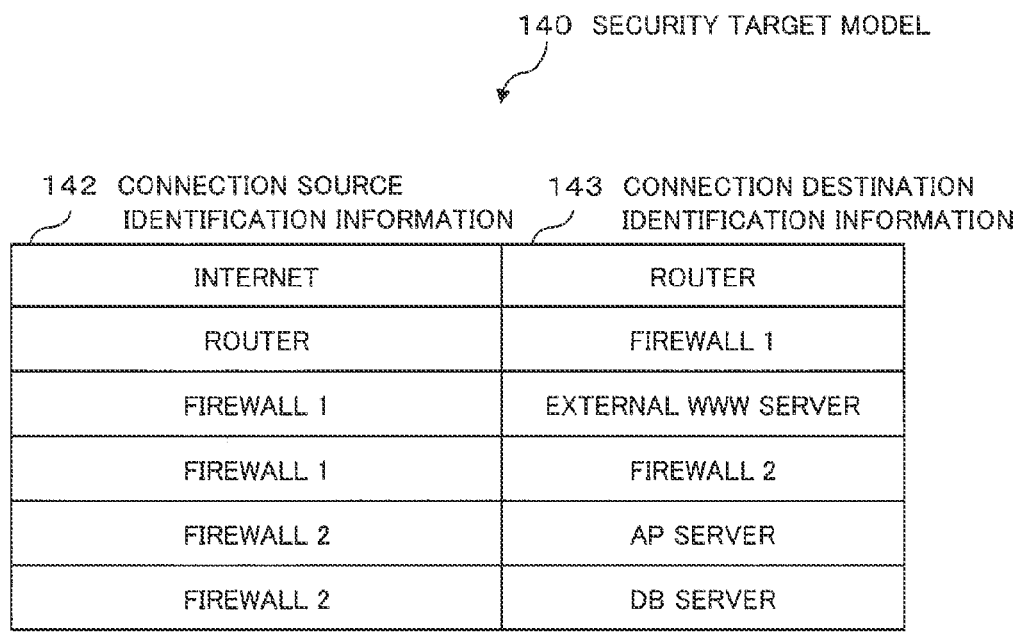
FIG. 3 is a figure showing an example of a security target model in the first exemplary embodiment.

FIG. 3 is a figure showing an example of a security target model 140 which is information for indicating the structure of the security target part of the system to be verified. As shown in FIG. 3, the security target model 140 includes as information which indicates the structure of the security target part of the system to be verified, connection source identification information (for example, device name and function block name) 142 and connection destination identification information 143. Further, the security target model 140 shown in FIG. 3 is the information which indicates the structure of the security target part of the system to be verified corresponding to the system requirement 110 shown in FIG. 2. In case the system requirement 110 indicates a plurality of case numbers of the security requirements, the number of the existing security target model 140 is the same number of kinds of structures of the security target part of the system to be verified corresponding to the security requirements.

The result of the verification of the security of the system to be verified is information which indicates whether a function which the security target model 140 possesses satisfies the requirements of security indicated by the system requirement 110. Further, the result may include other information (for example, operational conditions of a security function and setting information to satisfy the security).

Next, each component provided in the security verification device 101 in the first exemplary embodiment will be described. Further, the components shown in FIG. 1 indicate the components in units of functions, not the components in units of hardware.

===Requirement Model Generation Unit 200===

The requirement model generation unit 200 refers to contents of the verification item database 210, selects and outputs a verification item in which the security function, an implementation method and target parts are made to relate on the basis of the system requirement 110 of the system to be verified. Also, the requirement model generation unit 200, on the basis of the security target model 140, generates and outputs information which indicates the requirements of security for each of the target parts which are included in the selected verification item.

Specifically, first, the requirement model generation unit 200 refers to the verification item database 210, and selects and outputs the verification item corresponding to the received system requirement 110.

FIG. 4 is a figure showing an example of the verification item database 210. As shown in FIG. 4, the verification item database 210 includes equal to or more than one of records (verification items) in which a security function name 212, a implementation method 213 and parts information 214 are made to relate. The security function name 212 is information which specifies contents of security (for example, subject authentication). The implementation method 213 is information which indicates the implementation method (for example, ID (IDENTIFICATION)/password method) of security specified by the security function name 212. The parts information 214 includes identification information (for example, WWW server, AP server and DB server) of each of equal to or more than one of parts (for example, devices and function blocks) which implements the security.

FIG. 5 is a figure showing an example of a verification item 211 which the requirement model generation unit 200 selected. Further, FIG. 5 indicates an example of a case when, corresponding to the system requirement 110, one record is selected from the verification item database 210. However, in case the system requirement 110 designates a plurality of the contents of security, the selected record may also be in plural.

Second, the requirement model generation unit 200 generates a model which indicates requirements of security verification for each part from the received security target model 140 and the verification item 211.

FIG. 6 is a figure showing an example of a requirement model 230 which is a model which indicates the requirements of security verification for each part. As shown in FIG. 6, the requirement model 230 includes equal to or more than one of records which is structured from parts identification information 232, a security function name 233 and an implementation method 234. The parts identification information 232 is information which identifies each part. This parts identification information 232 is identification information where identification information of the parts which is indicated in the parts information 214 of the verification item 211 and the connection destination identification information 143 which is included in the received security target model 140 coincide. The security function name 233 is a copy of the security function name 212 of the verification item 211. The implementation method 234 is a copy of the implementation method 213 of the verification item 211.

That is, the requirement model generation unit 200 extracts, among the identification information of the parts which are indicated in the parts information 214 of the verification item 211, the parts which are specified by identification information which coincides with the connection destination identification information 143 which is included in the received security target model 140. Consecutively, the requirement model generation unit 200 generates the requirement model 230 which indicates the requirements of security for each extracted part.

===Verification Item Database 210===

The verification item database 210 stores a plurality of the verification items 211, and outputs them in reply to a request.

===Possessed Function Model Generation Unit 300===

The possessed function model generation unit 300 extracts a function item from the function item database 310 on the basis of the implementation method 213 which is included in the verification item 211 which the requirement model generation unit 200 outputs. Consecutively, the possessed function model generation unit 300, on the basis of the extracted function item, generates and outputs information which indicates a possessed function of security of each part included in the security target model 140.

Specifically, first, the possessed function model generation unit 300 extracts, on the basis of the implementation method 213 of the received verification item 211, the function item from the function item database 310.

FIG. 7 is a figure showing an example of the function item database 310. As shown in FIG. 7, the function item database 310 includes equal to or more than one of records (function items) in which parts identification information 312, a security function name 313 and an implementation means 314 are made to relate. The parts identification information 312 is information which identifies each part. The security function name 313 is information which specifies the contents of security (for example, identity authentication). The implementation means 314 is information which indicates an implementation means (for example, ID (IDENTIFICATION)/password method) of the security specified by the security function name 313 of the parts specified by the parts identification information 312.

FIG. 8 is a figure showing an example of a function item 320. As shown in FIG. 8, the function item 320 includes equal to or more than one of records selected from the verification item database 210.

Second, the possessed function model generation unit 300 generates a model which indicates the possessed function of security verification for each part from the received security target model 140 and the function item 320.

Figure 9:
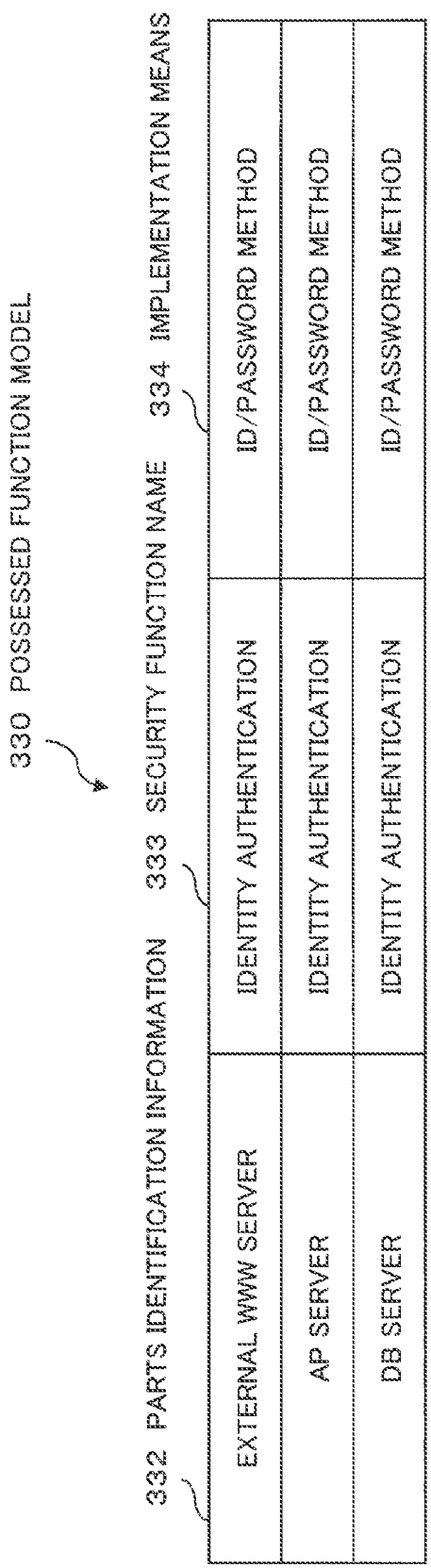
FIG. 9 is a figure showing an example of a possessed function model in the first exemplary embodiment.

FIG. 9 is a figure showing an example of a possessed function model 330 which is a model which indicates the possessed function of security verification for each part. As shown in FIG. 9, the possessed function model 330 includes equal to or more than one of records which is structured from parts identification information 332, a security function name 333 and an implementation means 334. The parts identification information 332 is information which identifies each part. This parts identification information 332 is identification information where the parts identification information 312 of the function item 320 and the connection destination identification information 143 which is included in the received security target model 140 coincide. The security function name 333 is a copy of the security function name 313. The implementation means 334 is a copy of the implementation means 314 of the function item 320.

That is, the possessed function model generation unit 300 extracts, among the parts identification information 312 of the function item 320, a record which includes the parts identification information 312 which coincides with the connection destination identification information 143 which is included in the received security target model 140. Consecutively, the possessed function model generation unit 300 generates the possessed function model 330 which indicates the possessed function for each extracted part.

===Function Item Database 310===

The function item database 310 stores a plurality of the function items 320, and outputs them in reply to a request.

===Verification Unit 400===

The verification unit 400 performs comparison and verification of the requirement model 230 and the possessed function model 330 and outputs the verification result.

Specifically, first, the verification unit 400 verifies, among the parts identification information 232 included in the requirement model 230, whether the parts identification information 232 exists which coincides with neither of the parts identification information 332 which is included in the possessed function model 330.

Second, the verification unit 400 outputs the verified result. This verification result is information which indicates that the security target model 140 satisfies the system requirement 110 or information which indicates not satisfying it.

Further, the verification unit 400 may output the security function name 233 and the possessed function model 330 in addition to the verification result.

Above is a description concerning each component in units of functions of the security verification device 101.

Next, the component in units of hardware of the security verification device 101 will be described.

Figure 10:
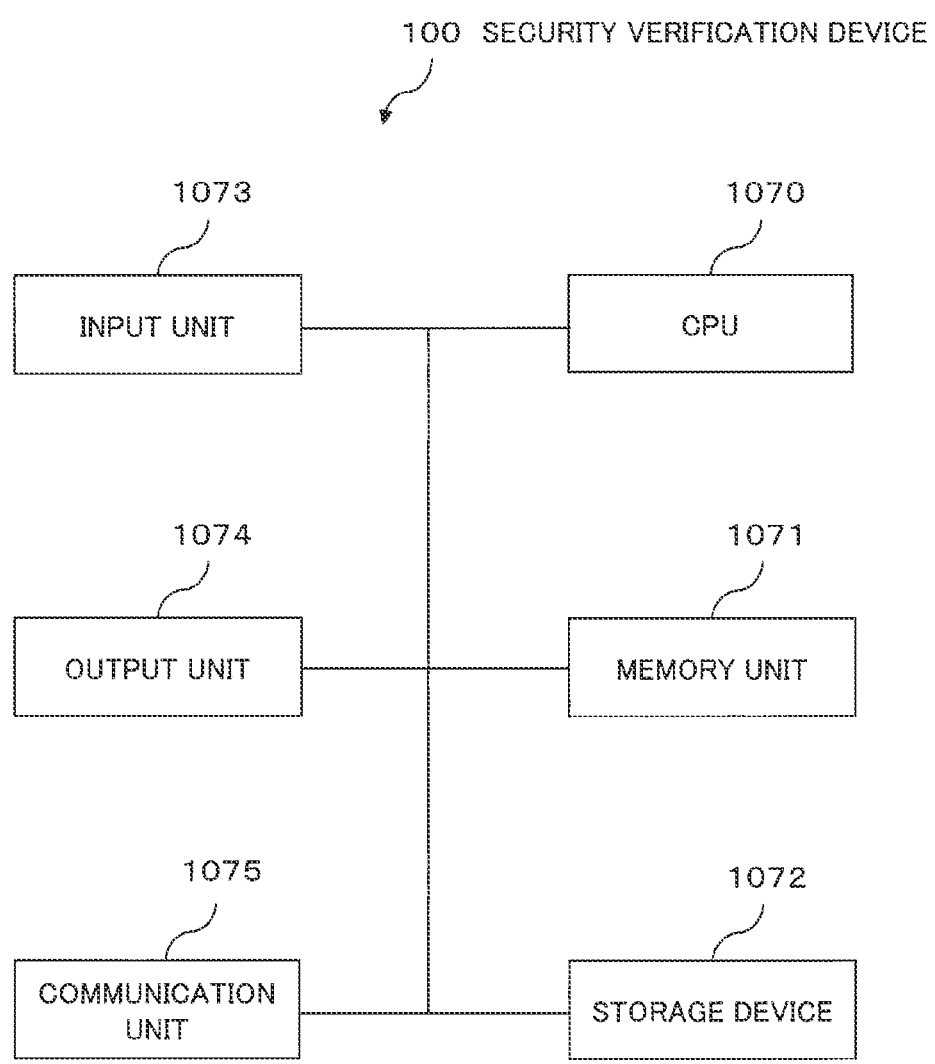
FIG. 10 is a figure showing a hardware structure of the first exemplary embodiment.

FIG. 10 is a figure showing a hardware structure of the security verification device 101 according to this exemplary embodiment and its peripheral device. As shown in FIG. 10, the security verification device 101 includes: a CPU (Central Processing Unit) 1070, a memory unit 1071, a storage device 1072, an input unit 1073, an output unit 1074 and a communication unit 1075.

Figure 16:
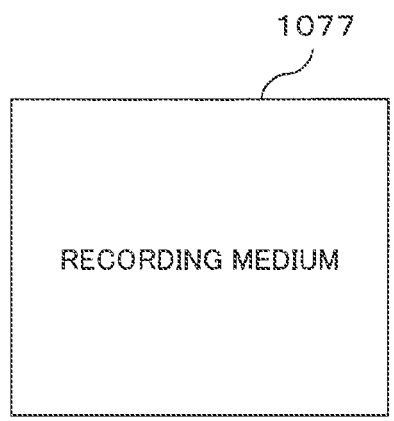
FIG. 16 is a block diagram showing an example of a non-volatile storage medium in which a program is recorded.

FIG. 16 is a block diagram showing an example of a non-volatile storage medium 1077 in which a program is recorded.

The CPU 1070 makes an operating system (not shown) operate and controls entire operation of the security verification device 101 according to this exemplary embodiment. Also, the CPU 1070 reads a program or data, for example, from the non-volatile recording medium 1077 (or storage medium) loaded on the storage device 1072 and writes the read program or the data in the memory unit 1071. And the CPU 1070, following the program read or on the basis of the data read, executes various processing as the requirement model generation unit 200, the possessed function model generation unit 300 and the verification unit 400 shown in FIG. 1.

Further, the CPU 1070 may download the program or the data into the memory unit 1071 from an external computer (not shown) connected to a communication network (not shown).

The memory unit 1071 stores the program or the data.

The storage device 1072 is, for example, an optical disc, a flexible disc, a magnetic optical disc, an external hard disk and a semiconductor memory and includes the non-volatile storage medium 1077. The storage device 1072 records the program so that it is computer-readable. Also, the storage device 1072 may record the data so that it is computer-readable. The storage device 1072 may include the verification item database 210 and the function item database 310.

The input unit 1073 is implemented, for example, by such as a mouse, a keyboard, and a built-in key button, and is used for input operation. The input unit 1073 is not limited to the mouse, the keyboard and the built-in key button, and may be, for example, such as a touch panel, an accelerometer, a gyroscope sensor and a camera.

The output unit 1074 is implemented by, for example, a display, and is used in order to check the output.

The communication unit 1075 implements interface between the security verification device 101 and an external device (not shown). The communication unit 1075 is included as a part of the requirement model generation unit 200, the possessed function model generation unit 300 and the verification unit 400.

Above is a description concerning each component in units of hardware of the security verification device 101.

As has been described above, the blocks in units of functions shown in FIG. 1 are implemented by the hardware structure shown in FIG. 10. However, the implementation means of each part provided in the security verification device 101 is not limited to the above. That is, the security verification device 101 may be implemented by one device which is physically combined or may be implemented by connecting equal to or more than two devices which are physically separated by wire or by wireless, and by these pluralities of devices.

Also, the non-volatile recording medium 1077 in which the program mentioned above is recorded is supplied to the security verification device 101, and the security verification device 101 may read and execute the program stored in the non-volatile recording medium 1077. That is, this exemplary embodiment includes an exemplary embodiment of recording medium which stores temporarily or non-temporarily the program which the security verification device 101 executes.

Next, operation of this exemplary embodiment will be described in detail with reference to FIG. 1-FIG. 11.

Figure 11:
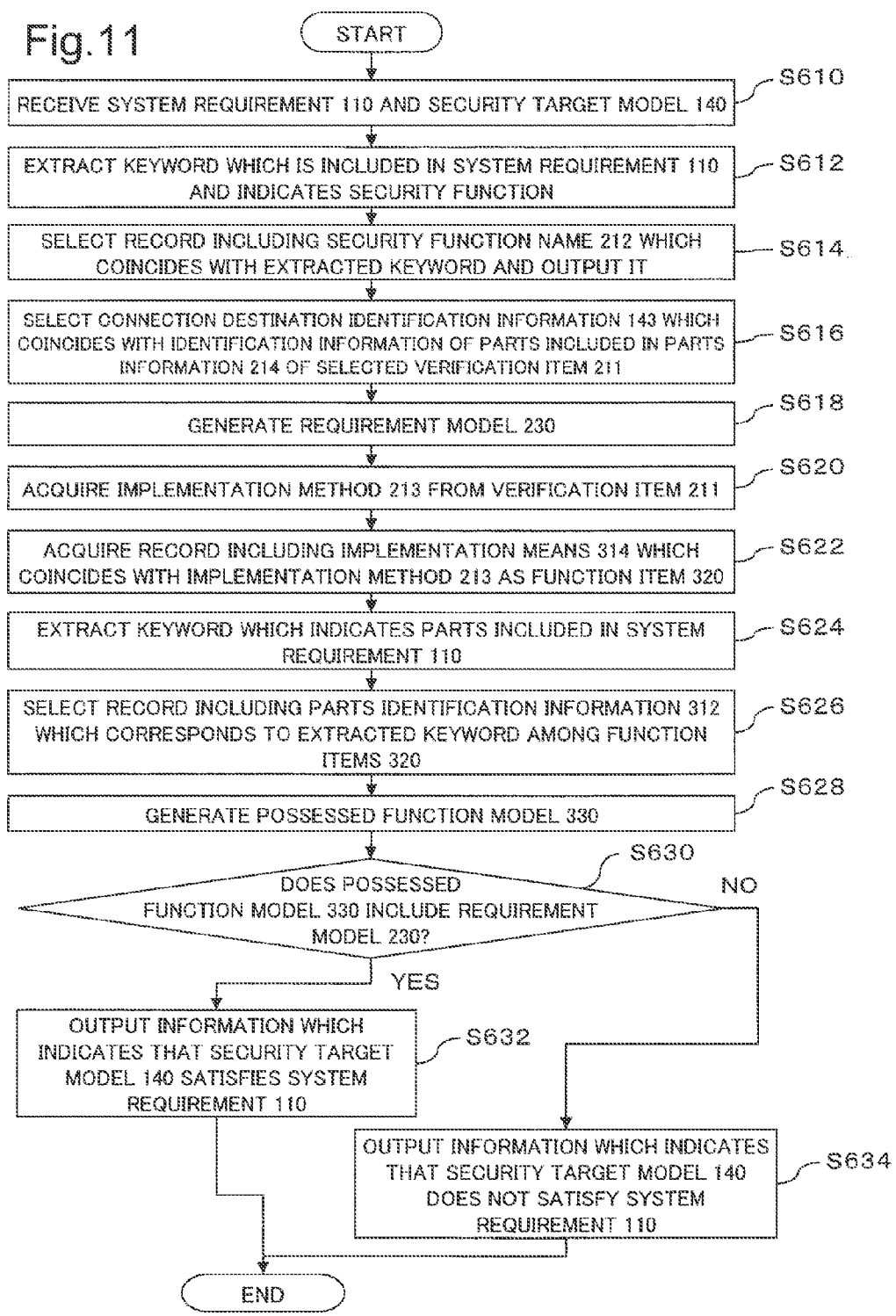
FIG. 11 is a flow chart showing operation of a security verification device 101 in the first exemplary embodiment.

FIG. 11 is a flow chart showing operation of the security verification device 101. Further, processing by this flow chart may be executed on the basis of program control by the CPU mentioned above. Also, as for a step name of the processing, it is described by a symbol like S601.

The security verification device 101 receives the system requirement 110 and the security target model 140 from an external device (not shown) (S610).

For example, the security verification device 101 receives the system requirement 110 and the security target model 140 from an external server (not shown) via the communication unit 1075 shown in FIG. 10. Also, the security verification device 101 may receive the system requirement 110 and the security target model 140 which an operator inputs from the input unit 1073 shown in FIG. 10.

Next, the requirement model generation unit 200 of the security verification device 101 extracts the keyword (in case of the system requirement 110 shown in FIG. 2, 'subject authentication') which indicates the security function which is included in the received system requirement 110 (S612).

Next, the requirement model generation unit 200 searches through the verification item database 210 and selects and outputs a record (the verification item 211) which includes the security function name 212 which coincides with the extracted keyword (S614).

Next, the requirement model generation unit 200 selects the connection destination identification information 143 of the security target model 140 which coincides with the identification information of parts (here, 'WWW server', 'AP server' and 'DB server') which are included in the parts information 214 of the selected verification item 211 (S616).

Consecutively, the requirement model generation unit 200 generates the requirement model 230 by the following first, second and third procedures. First, the requirement model generation unit 200 lets the selected connection destination identification information 143 be the parts identification information 232. Second, the requirement model generation unit 200 lets the security function name 212 of the verification item database 210 be the security function name 233. Third, the requirement model generation unit 200 lets the implementation method 213 of the verification item database 210 be the implementation method 234 (S618).

Next, the possessed function model generation unit 300 acquires the implementation method 213 from the received verification item 211 (S620).

Next, the possessed function model generation unit 300 searches through the function item database 310, and acquires a record including the implementation means 314 which coincides with the acquired implementation method 213 as the function item 320 (S622).

Next, the possessed function model generation unit 300 extracts the keyword (in case of the system requirement 110 shown in FIG. 2, 'WEB', 'AP' and 'DB') which indicates the parts which is included in the received system requirement 110 (S624).

Next, the possessed function model generation unit 300 selects, among the function items 320, a record including the parts identification information 312 corresponding to the extracted keyword (S626).

Consecutively, the possessed function model generation unit 300 generates the possessed function model 330 by letting the parts identification information 312 of the selected record be the parts identification information 332 and by letting the implementation means 314 be the implementation means 334 (S628).

Next, the verification unit 400 determines whether the possessed function model 330 includes a record which corresponds to each record included in the requirement model 230 (S630). Here, the record which corresponds to each record included in the requirement model 230 and which is included in the possessed function model 330 satisfies the following first, second and third condition. First, the parts identification information 232 of the record included in the requirement model 230 and the parts identification information 332 of the record included in the possessed function model 330 coincide. Second, the security function name 233 of the record included in the requirement model 230 and the security function name 333 of the record included in the possessed function model 330 correspond. Third, the implementation method 234 of the record included in the requirement model 230 and the implementation means 334 of the record included in the possessed function model 330 coincide. Further, the security function name 333 which corresponds to the security function name 233 is, for example, 'identity authentication' against 'subject authentication', which represents a same authentication function.

In case the possessed function model 330 includes records which correspond to all the records included in the requirement model 230 (YES in S630), the verification unit 400 outputs information which indicates that the security target model 140 satisfies the system requirement 110 (S632).

In case the possessed function model 330 does not include a record which corresponds to either one of the records included in the requirement model 230 (NO in S630), the verification unit 400 outputs information which indicates that the security target model 140 does not satisfy the system requirement 110 (S634).

The first effect in this exemplary embodiment mentioned above is a point that it makes possible to verify that elements for implementing the security measures necessary for the system can be prepared without omission.

The reason is because the following structure is included. That is, the requirement model generation unit 200 generates the requirement model 230 which indicates the security requirements for each part corresponding to the security requirements of the system to be verified. Second, the possessed function model generation unit 300 generates the possessed function model 330 which indicates the possessed functions concerning the security for each part which structures the security target parts of the system to be verified. Third, the verification unit 400 performs comparison and verification of the requirement model 230 and the possessed function model 330.

The second effect in this exemplary embodiment mentioned above is a point that it makes possible to present how the system requirement 110 is implemented by the components of the system to be verified.

The reason is because the verification unit 400 outputs the security function name 233 and the possessed function model 330 in addition to the verification result.

The Second Exemplary Embodiment

Next, the second exemplary embodiment of the present invention will be described in detail with reference to drawings. Hereinafter, the description will be omitted concerning the contents overlapping the description mentioned above within the range that the description of this exemplary embodiment will not become uncertain.

Figure 12:
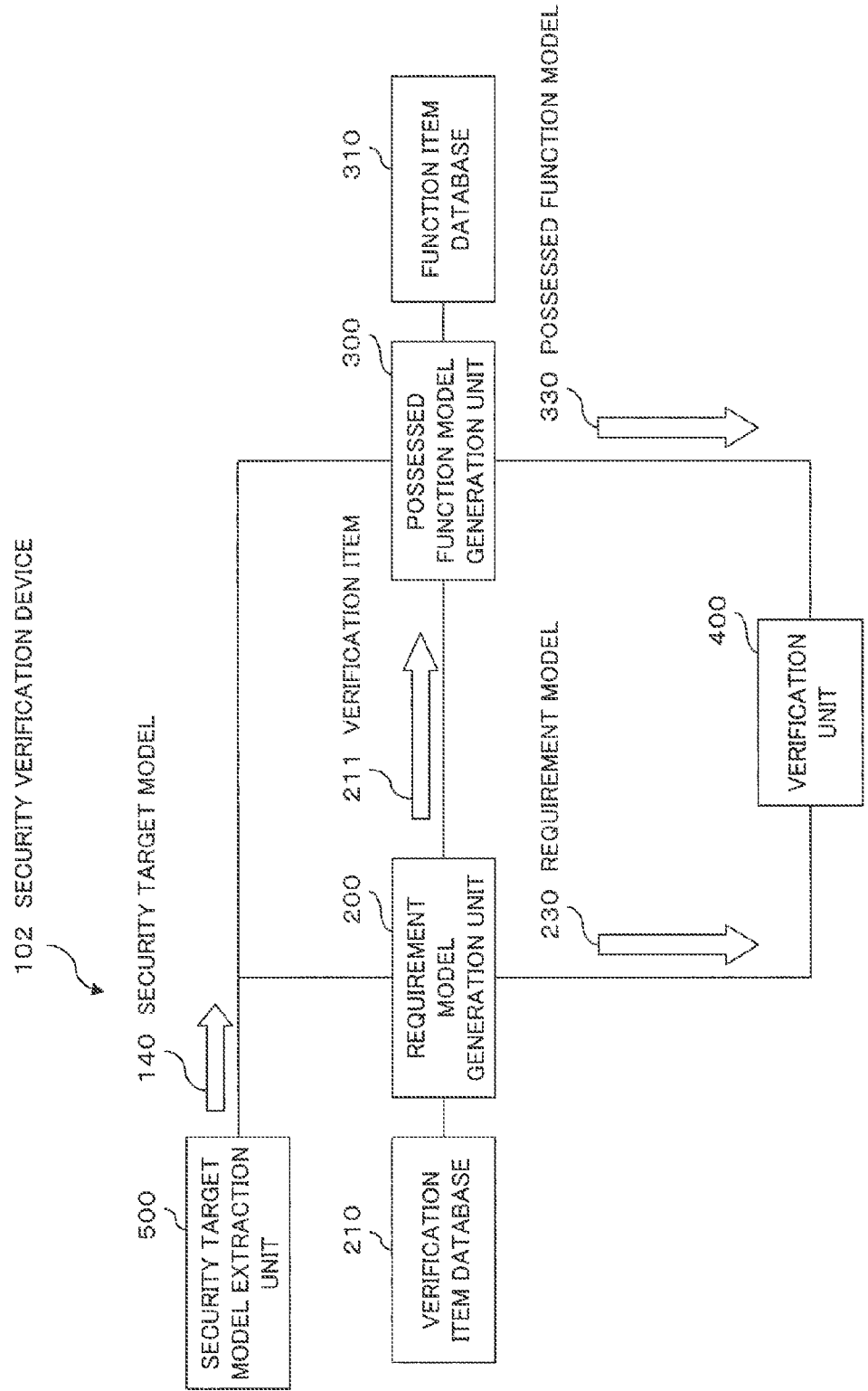
FIG. 12 is a block diagram showing a structure of the second exemplary embodiment.

FIG. 12 is a block diagram showing a structure of a security verification device 102 according to the second exemplary embodiment of the present invention.

Referring to FIG. 12, the security verification device 102 of this exemplary embodiment further includes a security target model extraction unit 500 compared with the security verification device 101 of the first exemplary embodiment.

The security verification device 102 receives, instead of the security target model 140 which the security verification device 101 of the first exemplary embodiment receives, a system model 120 as shown in FIG. 13. The system model 120 includes a structure of the security target model 140 as a part of the entire structure. For example, the system model 120 is information which indicates a structure of the entire system to be verified.

FIG. 13 is a figure showing an example of the system model 120. As shown in FIG. 13, the system model 120 includes, as information which indicates the structure of the entire system to be verified, the connection source identification information 142 and the connection destination identification information 143.

===Security Target Model Extraction Unit 500===

The security target model extraction unit 500 generates the security target model 140 from the received system model 120 on the basis of the system requirement 110 and outputs it.

For example, the security target model extraction unit 500 extracts, on the basis of the keyword 'WEB' included in the system requirement 110, records which concern a route from 'external WWW server' to 'internet' from the system model 120. Further, the security target model extraction unit 500 extracts, on the basis of the keyword 'AP' included in the system requirement 110, records which concern a route from 'AP server' to 'internet' from the system model 120. Further, the security target model extraction unit 500 extracts, on the basis of the keyword 'DB' included in the system requirement 110, records which concern a route from 'DB server' to 'internet' from the system model 120. Next, the security target model extraction unit 500 outputs these extracted records as the security target model 140.

The effect in this exemplary embodiment mentioned above is a point that it makes possible to generate the security target model 140 correctly.

The reason is because the security target model extraction unit 500 generates the security target model 140 on the basis of the system requirement 110.

The Third Exemplary Embodiment

Next, the third exemplary embodiment of the present invention will be described in detail with reference to drawings. Hereinafter, the description will be omitted concerning the contents overlapping the description mentioned above within the range that the description of this exemplary embodiment will not become uncertain.

Figure 14:
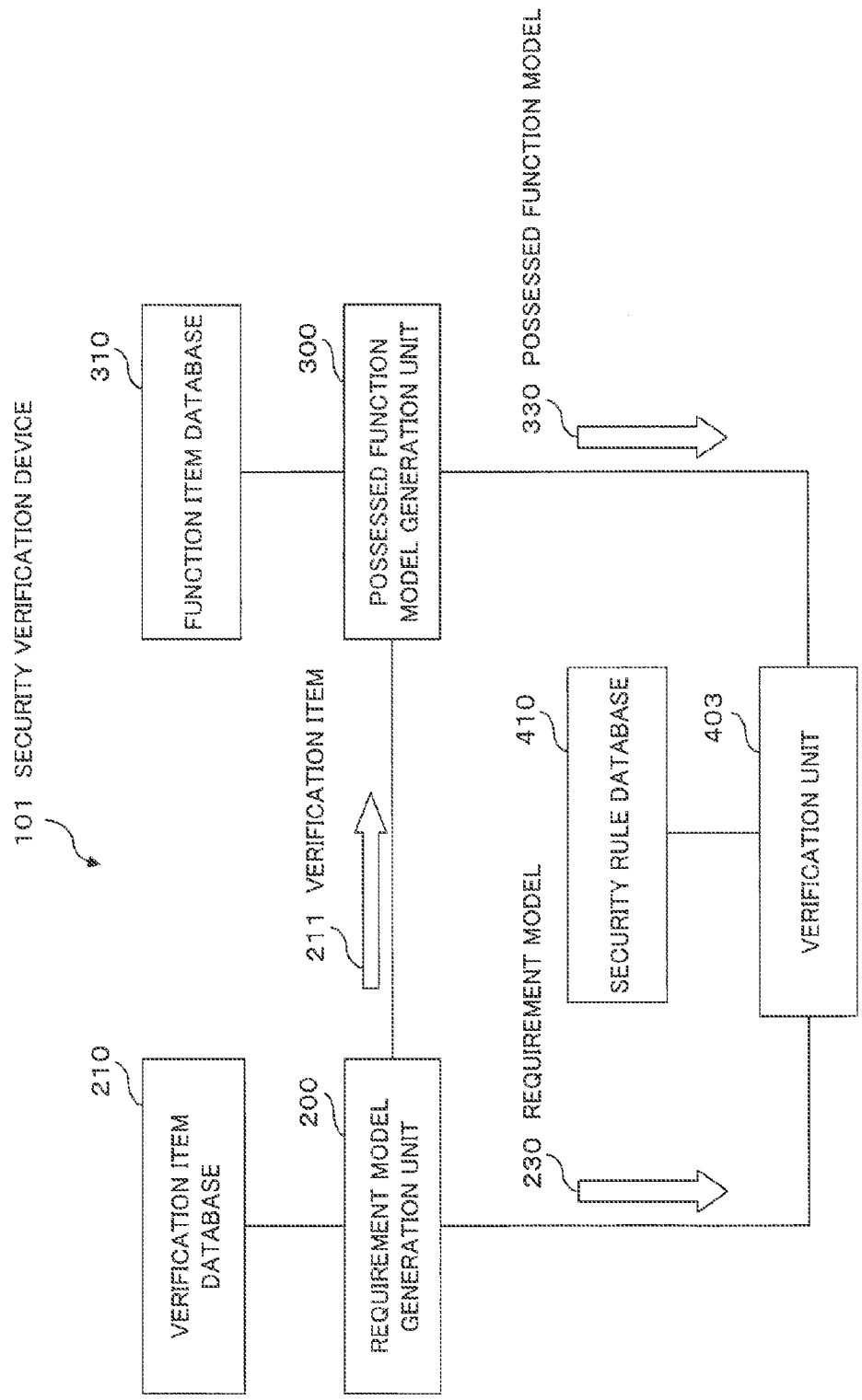
FIG. 14 is a block diagram showing a structure of the third exemplary embodiment.

FIG. 14 is a block diagram showing a structure of a security verification device 103 according to the third exemplary embodiment of the present invention.

Referring to FIG. 14, the security verification device 103 of this exemplary embodiment further includes a security rule databases (also called as a security rule storage means) 410 compared with the security verification device 101 of the first exemplary embodiment. Also, the security verification device 103 includes a verification unit 403 instead of the verification unit 400 when compared with the security verification device 101 of the first exemplary embodiment.

===Security Rule Database 410===

FIG. 15 is a figure showing an example of the security rule database 410. As shown in FIG. 15, the security rule database 410 includes equal to or more than one of records in which a security function name 412 and rule identification information 413 are made to relate. The security function name 412 is information which specifies the contents of security. The rule identification information 413 is information which specifies equal to or more than one of each rule in security standards set in advance corresponding to the contents of security specified in the security function name 412. Here, the security standards set in advance are, for example, public security standards (for example, 'Uniform Standards for Information Security Measures for the Government Organization'). Also, information which specifies each rule is, for example, a title number of 'Standards for Information Security Measures for the Central Government Computer Systems'. Also, the information which specifies each rule may be a set of a standard name (for example, ISMS) and identification information of each security function which is stipulated by the standard specified by the standard name (for example, ISMS: 12.1.4).

===Verification Unit 403===

The verification unit 403 outputs, in addition to the verification result which the verification unit 400 outputs, the rule identification information 413 corresponding to the security function which is a target of the verification result.

For example, in case verification is performed concerning the requirement model 230 of which the security function name 233 is 'subject authentication', the verification unit 403 acquires '2.2.1.1 (1) (a)' of the rule identification information 413 by referring to the security rule database 410 and outputs it together with the verification result.

Further, the verification unit 403 may refer to other database (not shown), and output related information (for example, setting information of the parts specified by the parts identification information 332) together with the verification result.

Also, the verification unit 403 may output the security function name 233 and the possessed function model 330 in addition to the verification result same as the first exemplary embodiment.

Further, the verification unit 403 may be applied to the second exemplary embodiment.

The first effect in this exemplary embodiment mentioned above is a point that it makes possible to indicate, for each item of the security rules defined by the government/industry, whether the system to be verified satisfies the rules.

The reason is because the verification unit 403 refers to the security rule database 410, and output the rule identification information 413.

The second effect in this exemplary embodiment mentioned above is a point that it makes possible to present how the security standards set in advance are implemented by the components of the system to be verified.

The reason is because the verification unit 400 outputs the security function name 233 and the possessed function model 330 in addition to the verification result.

Further, in each exemplary embodiment mentioned above, cases are described where input information is inputted to each security verification device concerning one security function, and one verification result corresponding to that is output from each security verification device. However, each security verification device may be such that the input information is input concerning a plurality of security functions, and a plurality of verification results corresponding to that outputs. In this case, the verification result and other related information may be output in a form of a table.

Also, in case of the exemplary embodiment 3, the table may be each item of the security standards set in advance and a list corresponding to each item.

Each component described in each exemplary embodiment mentioned above may not necessarily be a being which is independent to each other. For example, for each component, a plurality of components may be implemented as one module, or one component may be implemented by a plurality of modules. Also, each component may be a structure such that a certain component is a part of other component or a part of a certain component and a part of other component overlap.

Each component and modules which implement each component in each exemplary embodiment described above may be, as needed and if possible, implemented by hardware-wise, implemented by a computer and a program, or implemented by a mixture of hardware-wise modules, the computer and the program. The program is recorded and provided in a non-volatile computer-readable recording medium such as a magnetic disk and a semiconductor memory and at a time of startup of the computer and so on, it is read by the computer. This program which is read makes the computer, by controlling operation of the computer, function as the components in each exemplary embodiment mentioned above.

Also, according to each exemplary embodiment described above, even though a plurality of operations has been described in sequence in the form of the flow chart, the order of the description does not limit the order in which the plurality of operations is executed. For this reason, when each exemplary embodiment is carried out, the order of the plurality of operations can be changed within the range which does not cause a trouble to the contents.

Further, according to each exemplary embodiment described above, the plurality of operations is not limited to be executed at a timing which differs to each other. For example, other operation may occur during execution of a certain operation, or execution timing of a certain operation and other operation may overlap in part or in all.

Further, according to each exemplary embodiment described above, although a certain operation is described to be a trigger of other operation, the description does not limit all the relations between the certain operation and the other operation. For this reason, when each exemplary embodiment is carried out, the relation of the plurality of operations can be changed within the range which does not cause a trouble to the contents. Also, the specific description of each operation of each component does not limit each operation of each component. For this reason, each specific operation of each component may be changed within the range which does not cause a trouble in function, in efficiency and in other characteristics when each exemplary embodiment is carried out.

Although the present invention has been described with reference to exemplary embodiments as above, the present invention is not limited to the exemplary embodiments mentioned above. Various changes which a person skilled in the art can understand within the scope of the present invention can be performed in the composition of the present invention and details.

This application claims priority based on Japanese Patent Application No. 2011-263754 filed on Dec. 1, 2011 and the disclosure thereof is incorporated herein in its entirety.

DESCRIPTION OF THE REFERENCE NUMERALS

101 Security verification device
102 Security verification device
103 Security verification device
110 System requirement
120 System model
140 Security target model
142 Connection source identification information
143 Connection destination identification information
200 Requirement model generation unit
210 Verification item database
211 Verification item
212 Security function name
213 Implementation method
214 Parts information
230 Requirement model
232 Parts identification information
233 Security function name
234 Implementation method
300 Possessed function model generation unit
310 Function item database
312 Parts identification information
313 Security function name
314 Implementation means
320 Function item
330 Possessed function model
332 Parts identification information
333 Security function name
334 Implementation means
400 Verification unit
403 Verification unit
410 Security rule database
412 Security function name
413 Rule identification information
500 Security target model extraction unit
1070 CPU
1071 Memory unit
1072 Storage device
1073 Input unit
1074 Output unit
1075 Communication unit

The invention claimed is:

1. A security verification device comprising:
a verification item storage unit which stores equal to or more than one of verification items which includes at least a security function name which is information for specifying contents of security, an implementation method which is information for indicating an implementation method of said security, and parts information which includes parts identification information which is identification information of each of equal to or more than one of parts which implements said security;
a function item storage-unit which stores equal to or more than one of function items which includes at least said parts identification information, said security function name, and an implementation-unit which is information for indicating an implementation-unit of security specified by said security function name of parts specified by said parts identification information;
a requirement model generation-unit which, on the basis of a system requirement which is information for indicating requirements of security of a system to be verified, selects and outputs said verification item from said verification item storage-unit, and, on the basis of a security target model which is information for indicating a structure of a security target part of said system to be verified, generates and outputs information for indicating the requirements of security of each part which is specified by the parts identification information included in the parts information of said selected verification item;
a possessed function model generation-unit which, on the basis of the implementation method which is included in said verification item which said requirement model generation-unit selected, extracts said function item from said function item storage-unit, and on the basis of said extracted function item, generates and outputs information which indicates a possessed function of security of each part included in said security target model; and
a verification-unit which performs comparison and verification of said information which indicates the requirements of security of each part and said information which indicates the possessed function of security of each part, and outputs a verification result of said comparison and verification.

2. The security verification device according to claim 1 characterized by further comprising a security target model extraction unit which, on the basis of said system requirement and a system model which includes a structure of said security target model as a part of an entire structure, generate and outputs said security target model.

3. The security verification device according to claim 1 characterized by further comprising a security rule storage unit which includes equal to or more than one of records in which said security function name and rule identification information which is information for specifying equal to or more than one of each rule in security standards set in advance and corresponding to the contents of security specified by said security function name are made to relate, wherein
    said verification unit refers to the security rule storage unit and outputs the rule identification information corresponding to a security function which is a target of said verification result.

4. The security verification device according to claim 1, characterized by said verification unit further outputting arbitrary information among said information which indicates the requirements of security of each part and said information which indicates the possessed functions of security of each part.

5. A security verification method comprising:
    a computer which stores equal to or more than one of verification items which includes at least a security function name which is information for specifying contents of security, an implementation method which is information for indicating an implementation method of said security and parts information which includes parts identification information which is identification information of each of equal to or more than one of parts which implements said security, and equal to or more than one of function items which includes at least said parts identification information, said security function name and an implementation unit which is information for indicating an implementation unit of security specified by said security function name of parts specified by said parts identification information,
    on the basis of a system requirement which is information for indicating requirements of security of a system to be verified, selecting and outputting said verification item from among said stored equal to or more than one of the verification items;
    on the basis of a security target model which is information for indicating a structure of a security target part of said system to be verified, generating and outputting information which indicates the requirements of security of each part which is specified by the parts identification information included in the parts information of said selected verification item;
    on the basis of the implementation method which is included in said selected said verification item, extracting said function item from among said stored equal to or more than one of the function items;
    on the basis of said extracted function item, generating and outputting information which indicates a possessed function of security of each part included in said security target model;
    performing comparison and verification of said information which indicates the requirements of security of each target part and said information which indicates the possessed function of security of each part; and
    outputting a verification result of said comparison and verification.

6. A non-transitory computer readable storage medium to store a program which makes a computer storing equal to or more than one of verification items which includes at least a security function name which is information for specifying contents of security, an implementation method which is information indicating an implementation method of said security and parts information which includes parts identification information which is identification information of each of equal to or more than one of parts which implements said security, and equal to or more than one of function items which includes at least said parts identification information, said security function name and an implementation unit which is information for indicating an implementation unit of security specified by said security function name of parts specified by said parts identification information carry out:
    a process which, on the basis of a system requirement which is information for indicating requirements of security of a system to be verified, selects and outputs said verification item from among said stored equal to or more than one of the verification items;
    a process which, on the basis of a security target model which is information for indicating a structure of a security target part of said system to be verified, generates and outputs information which indicates the requirements of security of each part which is specified by the parts identification information included in the parts information of said selected verification item;
    a process which, on the basis of the implementation method which is included in said selected said verification item, extracts said function item from among said stored equal to or more than one of the function items;
    a process which, on the basis of said extracted function item, generates and outputs information which indicates a possessed function of security of each part included in said security target model;
    a process which performs comparison and verification of said information which indicates the requirements of security of each target part and said information which indicates the possessed function of the security of each part; and
    a process which outputs a verification result of said comparison and verification.

7. The security verification device according to claim 2 characterized by further comprising a security rule storage unit which includes equal to or more than one of records in which said security function name and rule identification information which is information for specifying equal to or more than one of each rule in security standards set in advance and corresponding to the contents of security specified by said security function name are made to relate, wherein
    said verification unit refers to the security rule storage unit and outputs the rule identification information corresponding to a security function which is a target of said verification result.

8. The security verification device according to claim 2, characterized by said verification unit further outputting arbitrary information among said information which indicates the requirements of security of each part and said information which indicates the possessed functions of security of each part.

9. The security verification device according to of claim 3, characterized by said verification unit further outputting arbitrary information among said information which indicates the requirements of security of each part and said information which indicates the possessed functions of security of each part.

10. The security verification device according to claim 7, characterized by said verification unit further outputting arbitrary information among said information which indicates the requirements of security of each part and said information which indicates the possessed functions of security of each part.

11. A security verification device comprising:
    a verification item storage means for storing equal to or more than one of verification items which includes at least a security function name which is information for specifying contents of security, an implementation method which is information for indicating an implementation method of said security, and parts information which includes parts identification information which is identification information of each of equal to or more than one of parts which implements said security;

a function item storage means for storing equal to or more than one of function items which includes at least said parts identification information, said security function name, and an implementation means which is information for indicating an implementation means of security specified by said security function name of parts specified by said parts identification information;

a requirement model generation means, on the basis of a system requirement which is information for indicating requirements of security of a system to be verified, for selecting and outputting said verification item from said verification item storage means, and, on the basis of a security target model which is information for indicating a structure of a security target part of said system to be verified, for generating and outputting information which indicates the requirements of security of each part which is specified by the parts identification information included in the parts information of said selected verification item;

a possessed function model generation means, on the basis of the implementation method which is included in said verification item which said requirement model generation means selected, for extracting said function item from said function item storage means, and on the basis of said extracted function item, for generating and outputting information which indicates a possessed function of security of each part included in said security target model; and a verification means for performing comparison and verification of said information which indicates the requirements of security of each part and said information which indicates the possessed function of security of each part, and outputting a verification result of said comparison and verification.

\* \* \* \* \*